F. V. CHUDOMELKA.
POWER TRANSMITTING ATTACHMENT FOR AUTOMOBILES.
APPLICATION FILED MAY 13, 1916.
1,244,424.  Patented Oct. 23, 1917.
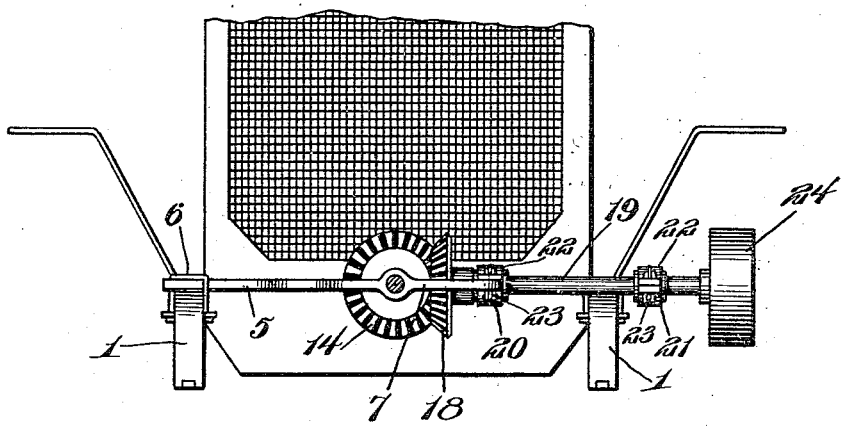
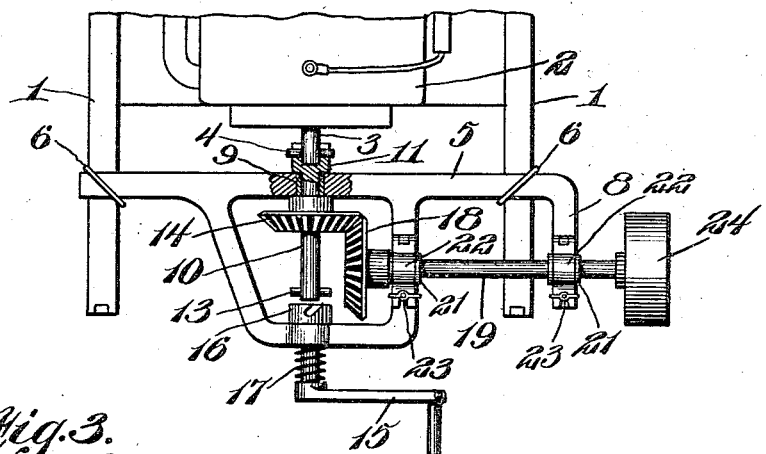
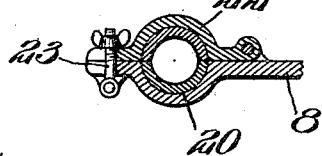
Witnesses
Inventor
F. V. Chudomelka
By Victor J. Evans
Attorney

UNITED STATES PATENT OFFICE.

FLORIAN V. CHUDOMELKA, OF SCRIBNER, NEBRASKA.

POWER-TRANSMITTING ATTACHMENT FOR AUTOMOBILES.

1,244,424.  Specification of Letters Patent.  Patented Oct. 23, 1917.

Application filed May 13, 1916. Serial No. 97,338.

*To all whom it may concern:*

Be it known that I, FLORIAN V. CHUDO-MELKA, a citizen of the United States, residing at Scribner, in the county of Dodge and State of Nebraska, have invented new and useful Improvements in Power-Transmitting Attachments for Automobiles, of which the following is a specification.

This invention relates to a power transmitting attachment for automobiles, whereby the power of the engine of the automobile may be utilized for driving auxiliary machinery, the main object of the invention being to provide an attachment which is adapted to be applied in position at the front of the chassis and to receive power from the engine through the ordinary cranking shaft.

A further object of the invention is to provide a device of the character described which is simple of construction, reliable and efficient in operation, capable of being applied to different types of machines in common use, and which is removable in part from the machine when it is not desired to employ the attachment for transmitting power.

The invention consists of the features of construction, combination and arrangement of parts hereinafter fully described and claimed, reference being had to the accompanying drawing in which:—

Figure 1 is a fragmentary front elevation showing the application of the invention to a known type of machine.

Fig. 2 is a sectional plan view of the attachment and parts of the automobile, with parts appearing in section.

Fig. 3 is a detail view showing a bearing construction.

Referring to the drawing 1 designates the chassis or frame of an automobile of ordinary general construction, 2 the engine or motor of the machine and 3 the engine shaft provided with the starting clutch pin 4.

The attachment comprises an attaching frame in the form of a bracket bar 5 which extends transversely at the front of the chassis 1 and is firmly attached thereto by clips or other suitable fastening elements 6. These clips or fastening elements are designed to securely hold the parts of the attachment in position, while admitting of their ready disconnection when occasion requires. This bar 5 carries a U-shaped bracket member 7 and a forwardly projecting bracket arm 8 which extends substantially parallel with the proximate arm of the said bracket member 7. These parts may be integral with or suitably fastened to the bracket bar 5.

The bar 5 is provided with a bearing opening 9 through which extends and in which is journaled a cranking shaft 10. This cranking shaft 10 is provided at its rear end with a clutch head 11 which engages the clutch pin 4 on the shaft 3, said cranking shaft extending forwardly to a point between the bar 5 and a forward portion of the bracket 7 and being provided at its free end with a clutch pin 13 similar to the clutch pin 4.

Keyed to the shaft 10 is a beveled driving gear 14 which is disposed immediately in advance of the bar 5 and limits the longitudinal play of the shaft 10, so as to maintain the clutch head 11 constantly in engagement with the pin 4. A cranking handle 15 is journaled in the forward portion of the bracket 7 and provided with a clutch head 16 to engage the pin 13, whereby the engine may be hand cranked in the usual manner, with the exception that the crank handle instead of being directly applied to the clutch pin 4 is applied to the clutch pin 13 of the interposed cranking shaft 10. A spring 17 is provided to retract the cranking handle when released and normally hold it retracted.

The gear 14 meshes with a gear 18 on a driven shaft 19 which extends parallel with the bar 5 at one side of the bracket 7 and is journaled in bearings 20 and 21 upon one of the arms of said bracket 7 and the bracket arm 8, whereby said shaft 19 is driven. The bearings 20 and 21 are provided with hinged caps 22, each secured in position by a fastening 23, so that when desired the shaft 19 may be removed when the vehicle is not being used for any of the purposes for which the attachment is designed. The shaft 19 carries at its outer end a pulley 24 whereby power may be transmitted through a belt to a corn-sheller, churn or any other type of apparatus which it may be desired to operate from the engine of the automobile while the automobile is standing still.

In practice, the supporting bracket or frame of the attachment is of such a character as to enable the device to be applied to various makes of machines, the attachment thus being interchangeable in this particular, and when applied it will be understood that the cranking shaft of the attachment is interposed between the engine shaft and starting crank and permanently clutched to the former to serve the dual purpose of a member of the starting mechanism and an intermediate shaft for transmitting power. Of course it will be understood that this cranking shaft may be employed in conjunction with and as part of an automatic starter, if desired, the invention being equally as well adapted for automatic as well as hand cranking purposes. When applied the device may be employed for utilizing the full or any part of the power of the engine for driving various kinds of machinery, and when the automobile is not employed for this purpose the shaft 19 with its parts may be attached, to avoid the carriage of unnecessary weight and to render the vehicle sightly in appearance when traveling. It will be obvious that the attachment may be applied to an automobile at a comparatively low cost and may be used for driving different kinds of machinery with advantage, no other operation being necessary to arrange the apparatus for use except to connect the pulley 24 with the apparatus to be driven, and to dispose the automobile in proper position to maintain the driving belt taut, and then simply chocking the wheels of the machine to hold it stationary during the operation of the engine.

Of course, it will be understood that suitable clutch mechanism may be provided for throwing either gear 10 or 18 into or out of action at will for obvious purposes.

I claim:—

In a power attachment for automobiles, the combination of a chassis, an engine provided with a driving shaft having a clutch member, a bracket bar fastened to the chassis, a U-shaped bracket carried by said bar, a bracket arm carried by the bar arranged substantially in parallel relation to one of the sides of said U-shaped bracket, said bracket arm and side of the U-shaped bracket being provided with bearings having hinged bearing caps and means for fastening the same in position, a driven shaft journaled in said bearings and removable therefrom, said shaft carrying a power transmitting pulley and a gear, a starting shaft journaled upon the bracket bar and having at one end a clutch member permanently engaging the clutch member on the engine shaft and at its free end a second clutch member, a gear upon said cranking shaft meshing with the gear upon the driven shaft, and a starting device rotatably mounted upon the outer end of the U-shaped bracket and having a clutch member for engagement with the clutch member upon the outer end of the crank shaft.

In testimony whereof I affix my signature.

FLORIAN V. CHUDOMELKA.

Witnesses:
RICHARD H. HOLSTEN,
WILL R. HRABAK.